US011117528B2

(12) United States Patent
Okuda

(10) Patent No.: US 11,117,528 B2
(45) Date of Patent: Sep. 14, 2021

(54) ATTACHMENT UNIT FOR VEHICLE PART, ATTACHING METHOD FOR VEHICLE PART, AND WINDSHIELD FOR VEHICLE

(71) Applicant: DENSO CORPORATION, Kariya (JP)

(72) Inventor: Sho Okuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 90 days.

(21) Appl. No.: 16/381,390

(22) Filed: Apr. 11, 2019

(65) Prior Publication Data

US 2019/0315289 A1 Oct. 17, 2019

(30) Foreign Application Priority Data

Apr. 13, 2018 (JP) .............................. JP2018-077219

(51) Int. Cl.
- *B60R 11/04* (2006.01)
- *G03B 17/56* (2021.01)
- *B60R 11/00* (2006.01)

(52) U.S. Cl.
CPC ............ *B60R 11/04* (2013.01); *G03B 17/561* (2013.01); *B60R 2011/0026* (2013.01); *B60R 2011/0059* (2013.01)

(58) Field of Classification Search
CPC ...... G03B 17/561; F16M 13/02; B60R 11/04; G08G 1/0175; G08G 1/054; E06B 7/28

USPC .......................................................... 396/419
See application file for complete search history.

(56) References Cited

U.S. PATENT DOCUMENTS

2012/0207461 A1    8/2012   Okuda
2015/0015713 A1*   1/2015   Wang ..................... H04N 7/183
                                                                                     348/148

FOREIGN PATENT DOCUMENTS

JP        2010274717 A   *   12/2010
JP           5316562 B2      10/2013

OTHER PUBLICATIONS

Translation of JP Publication No. 2010-274717; Inventor: Hashimoto et al.; Publication Date: Dec. 9, 2010. (Year: 2010).*

* cited by examiner

*Primary Examiner* — Clayton E. LaBalle
*Assistant Examiner* — Fang-Chi Chang
(74) *Attorney, Agent, or Firm* — Maschoff Brennan

(57) ABSTRACT

An attachment unit for a vehicle parts is provided which includes an attachment member disposed on a window of a vehicle. The attachment member has a traversing surface which extends in a direction traversing a surface of the window. The vehicle part is brought into contact with the traversing surface and then positioned relative to or secured to the window. This establishes a mechanical joint of the vehicle part to the window with correct alignment therebetween.

9 Claims, 10 Drawing Sheets

ATTACHMENT UNIT FOR VEHICLE PART, ATTACHING METHOD FOR VEHICLE PART, AND WINDSHIELD FOR VEHICLE

CROSS REFERENCE TO RELATED DOCUMENT

The present application claims the benefit of priority of Japanese Patent Application No. 2018-77219 filed on Apr. 13, 2018, the disclosure of which is incorporated herein by reference.

BACKGROUND

1 Technical Field

This disclosure relates generally to an attachment unit for a vehicle part, and an attaching method for a vehicle part, and a windshield for vehicles.

2 Background Art

Ab attachment mechanism is known which bonds a bracket to a front windshield of a vehicle and secures a vehicle-mounted camera to the front windshield using the bracket.

The attachment mechanism, however, has a risk that misalignment of the bracket with the front windshield may occur when the bracket (i.e., a vehicle part) is attached to the front windshield (i.e., a window).

SUMMARY

It is therefore an object of this disclosure to provide an attachment unit which is capable of attaching a vehicle part to a window with correct alignment therebetween.

According to one aspect of this disclosure, there is provided an attachment unit for a vehicle part which comprises: (a) an attachment member which is disposed on a window of a vehicle; and (b) a traversing surface which is formed on the attachment member and extends in a direction traversing the window. A vehicle part is brought into contact with the surface formed on the attachment member and positioned relative to or secured to the window.

In other words, the surface of the attachment member which extends in a direction traversing the window serves to make a physical contact with the vehicle part, thereby positioning the vehicle part relative to the window without any misalignment of the vehicle part with the window.

A feature described in this disclosure may be realized by an attaching method for a vehicle part or a windshield of a vehicle as well as well as the attachment unit.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

First Embodiment

Figure 1:
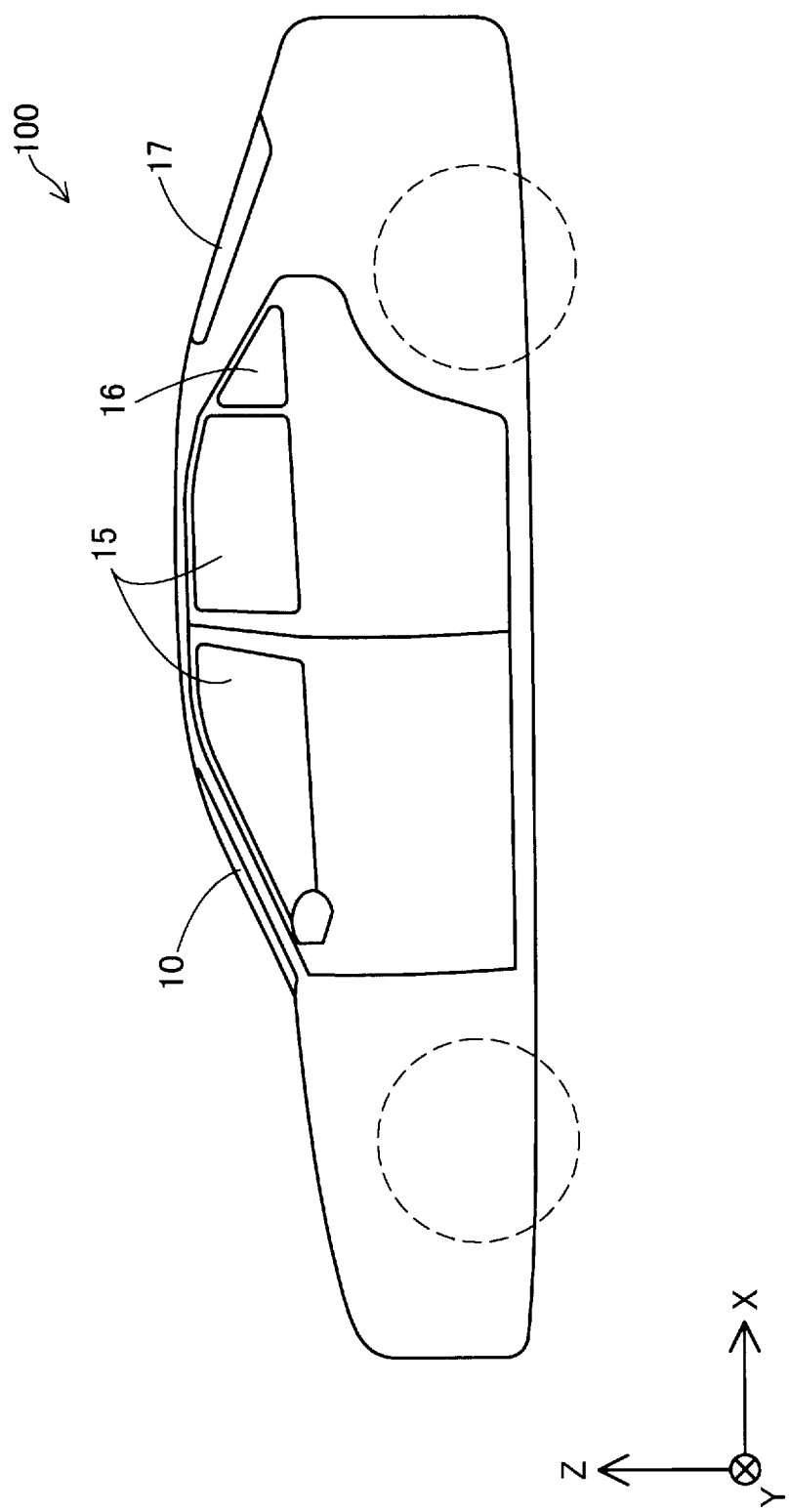
FIG. 1 is a left side view of a vehicle equipped with an attachment unit according to the first embodiment.
Figure 2:
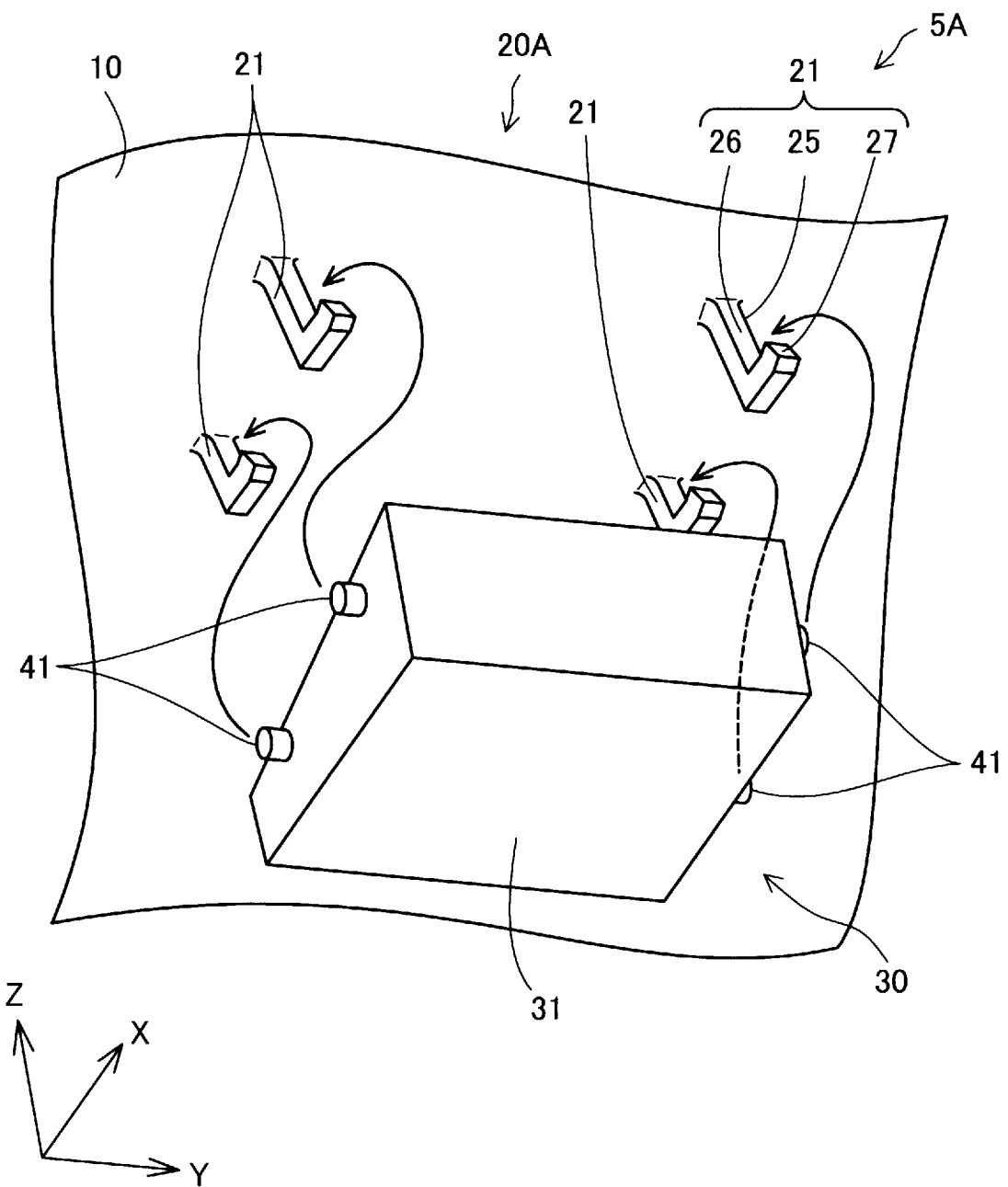
FIG. 2 is a perspective view which illustrates a structure of an attachment unit for a vehicle part according to the first embodiment.
Figure 3:
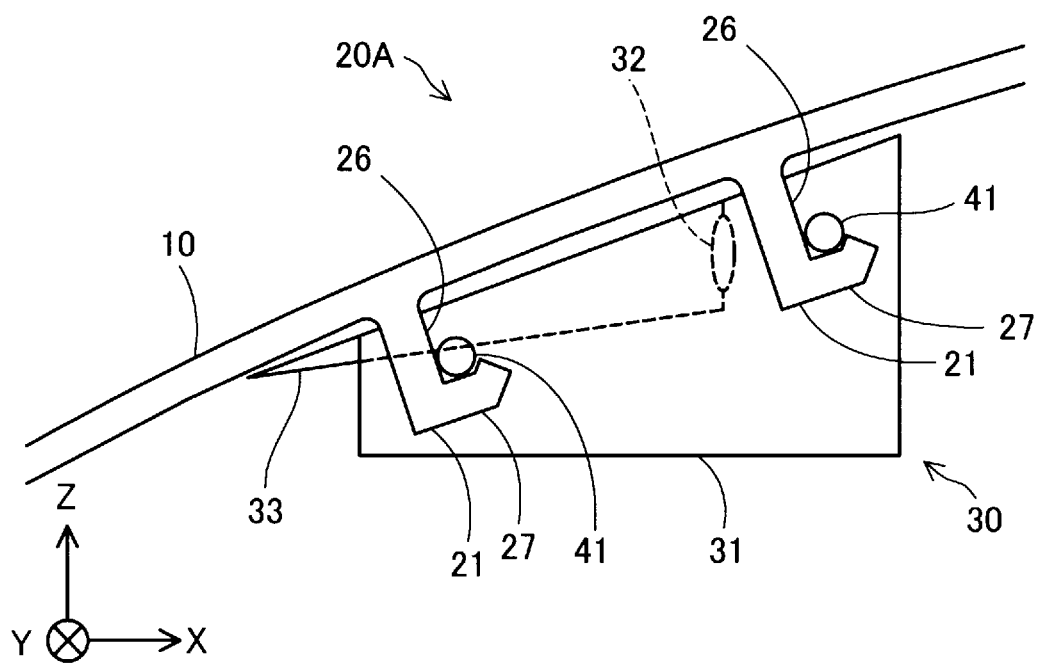
FIG. 3 is a left side view which illustrates an attachment unit for a vehicle part according to the first embodiment.
Figure 4:
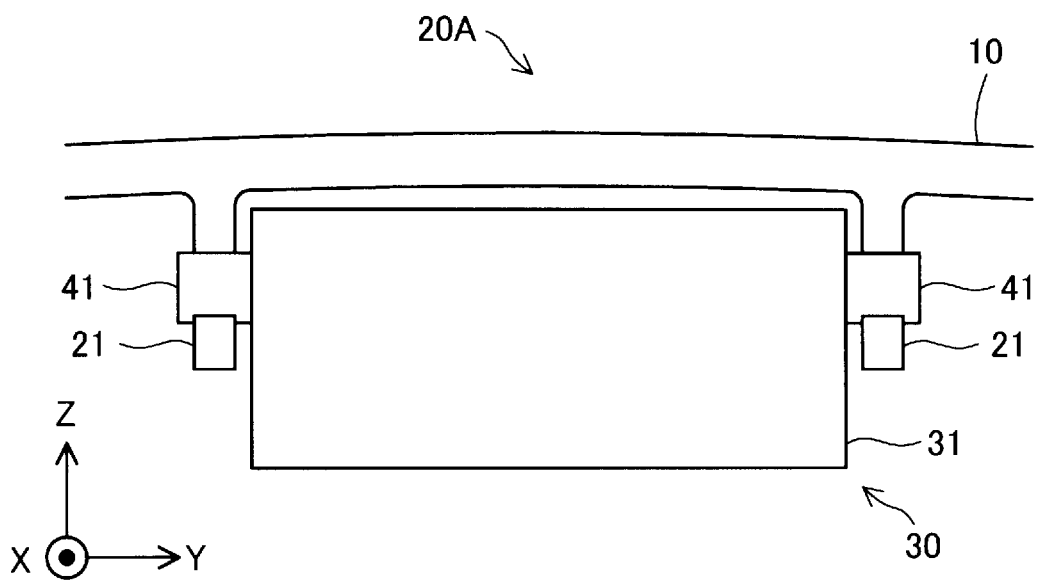
FIG. 4 is a rear view which illustrates an attachment unit for a vehicle part according to the first embodiment.
Figure 5:
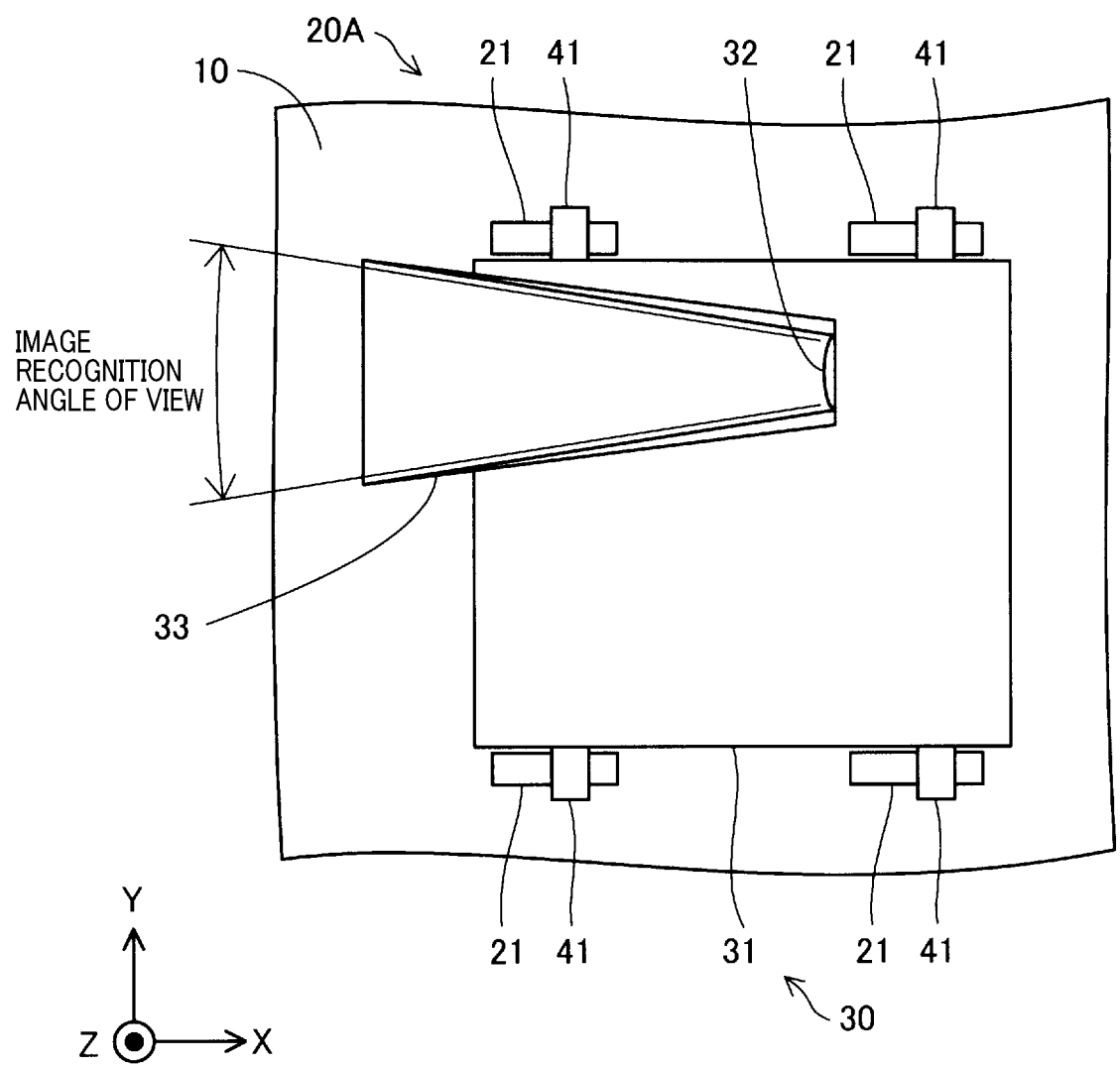
FIG. 5 is a top view which illustrates an attachment unit for a vehicle part according to the first embodiment.

The attachment unit 5A for a vehicle part according to the first embodiment, as illustrated in FIGS. 1 to 5, includes the attachment member 20A formed on the windshield 10 arranged in front of a driver's seat in the vehicle 100. In FIGS. 1 to 5, arrows X, Y, and Z represent three directions perpendicular to each other. The direction X is a longitudinal direction of the vehicle 100. The direction Y is a width-wise or lateral direction of the vehicle 100. The direction Z is a vertical direction of the vehicle 100. The same applies to other drawings. The vehicle 100 is a passenger automobile, such as a bus or truck. A window, as referred to herein, may be the side window 15, the quarter window 16 in the side of the vehicle 100, or the rear window 17 in the rear of the vehicle 100. In a case where the vehicle 100 is equipped with a sliding roof or sun roof in the ceiling of the vehicle 100, the window may be such a roof. A vehicle part, as referred to herein, the vehicle-mounted camera 30 which captures an image of a frontal view of the vehicle 100, but may alternatively be a rearview mirror or a rain sensor.

The attachment member 20A includes the first protrusions 21 formed in the shape of a hook. Each of the first protrusions 21 includes the support rod 25 and the head 27. The support rod 25 oriented perpendicular to a surface of the windshield 10 and extends inwardly into a passenger compartment of the vehicle 100. The support rod 25 has the traversing surface 26 extending in a direction traversing the surface of the windshield 10. The head 27 is joined to a front end of the support rod 25. Specifically, the head 27 is bent from the end of the support rod 25 in a barbed shape and extends rearward relative to the vehicle 100 (i.e., a +X-direction). The head 27 extends slightly upward in the backward direction at a given angle to a horizontal plan (i.e., an X-Y plane). The attachment member 20A has two arrays (i.e., a front and a rear array) of the first protrusions 21 which are arranged at a given interval away from each other in the longitudinal direction (i.e., the X-direction) of the vehicle 100. The front array includes the two protrusions 21 arranged at a given interval away from each other in the width-wise direction (i.e., the Y-direction) of the vehicle 100. The rear array includes the two protrusions 21 arranged at a given interval away from each other in the width-wise direction (i.e., the Y-direction) of the vehicle 100. In brief, the attachment member 20A includes the four first protrusions 21.

The windshield 10 equipped with the attachment member 20A is made by injecting synthetic resin, as molten at a high temperature, into a mould using injection moulding techniques. The synthetic resin may be acrylate resin or polycarbonate. The windshield 10 may alternatively made using cutting techniques. The windshield 10 may also be made of multiple layers, for example, an outer layer which is formed by synthetic resin and exposed outside of the vehicle 100, an inner layer which is formed by synthetic resin and exposed inside the vehicle 100, and a middle layer which is made of a resin film and interposed between the outer and inner layers. The windshield 10 may be surface-treated for improving wear resistance.

The vehicle-mounted camera 30 includes the housing 31, the first pins 41 (also referred to as first engaging portions), the lens 32, and the hood 33. The housing 31 has component parts of the vehicle-mounted camera 30 disposed therein and also has an upper surface slanting downward to the front of the vehicle 100 (i.e., the −X-direction) to have a thickness gradually decreasing forward. The right and left surfaces of the housing 31 has disposed thereon the first pins 41 which are of a cylindrical shape and protrudes outside the housing 31 (i.e., the Y-direction). Specifically, the left surface of the housing 31 has disposed on an upper portion thereof the two first pins 41: one being located on the front side of the housing 31, and the other being located on the rear side of the housing 31. Similarly, the right surface of the housing 31 has disposed on an upper portion thereof the two first pins 41: one being located on the front side of the housing 31, and the other being located on the rear side of the housing 31. The front first pins 41 on the right and left surfaces of the housing 31 are aligned with each other in the lateral direction of the vehicle 100. Similarly, the rear first pins 41 on the right and left surfaces of the housing 31 are aligned with each other in the lateral direction of the vehicle 100. In brief, the housing 31 has a total of four first pins 41: two on each of the right and left side surfaces. The lens 32 is arranged in a front portion of the housing 31. The hood 33 extends frontward from the front wall of the housing 31 in the −X-direction and is located at a level lower than the lens 32 in the vertical direction (i.e., the Z-direction) of the vehicle 100. The hood 33 serves to block entry of light, as coming from below the vehicle-mounted camera 30 and then reflected on the windshield 10, into the lens 32 as reflected glare.

The securement of the vehicle-mounted camera 30 to the attachment member 20A of the windshield 10 is achieved by arranging the vehicle-mounted camera 30 with the first pins 41 located in back of the respective first protrusions 21 of the attachment member 20A, placing the lower surfaces of the first pins 41 on the upper surfaces of the first protrusions 21, and then sliding the vehicle-mounted camera 30 frontward (i.e., the −X direction) until the front surfaces of the first pins 41 contact the traversing surfaces 26 of the first protrusions 21. The heads 27 of the first protrusions 21 are, as described above, inclined upward at a given angle to the horizontal plane, so that each of the first pins 41 engages one of the first protrusions 21, thereby causing the vehicle-mounted camera 30 to be hung from the windshield 10. When the vehicle-mounted camera 30 is attached to the windshield 10, the first protrusions 21 are located outside an image-recognition angle of view of the vehicle-mounted camera 30. The term "image-recognition angle of view", as referred to herein, represents an image-recognizing range of an angle of view imaged by the vehicle-mounted camera 30. The image recognition is achieved by a controller installed in the vehicle 100. The controller works to analyze an image captured by the vehicle-mounted camera 30 to detect another vehicle located in front of the vehicle 100 or markings on a road.

The attachment unit 5A in this embodiment is, as described above, designed to secure the vehicle-mounted camera 30 to the windshield 10 by bringing the first pins 41 of the vehicle-mounted camera 30 into contact with the traversing surfaces 26 of the first protrusions 21 to make engagement of the first pins 41 with the first protrusions 21. This ensures the stability in positioning the vehicle-mounted camera 30 on the windshield 10. In other words, the traversing surfaces 26 of the first protrusions 21 serve as stoppers to make a physical contact with the first pins 41, thereby positioning the vehicle-mounted camera 30 relative to the windshield 10.

The attachment of the vehicle-mounted camera 30 to the windshield 10 is accomplished without use of adhesive, thereby enabling the vehicle-mounted camera 30 to be arranged closer to the surface of the windshield 10 than when the vehicle-mounted camera 30 is bonded to the windshield 10. This enables the length of the hood 33 extending frontward from the housing 31 to be decreased, thereby facilitating the ease with which the vehicle-mounted camera 30 is mounted on the vehicle 100.

The first protrusions 21 are, as described above, located outside the image-recognition angle of view of the vehicle-mounted camera 30, thereby preventing the first protrusions 21 from being imaged by the vehicle-mounted camera 30.

Second Embodiment

Figure 6:
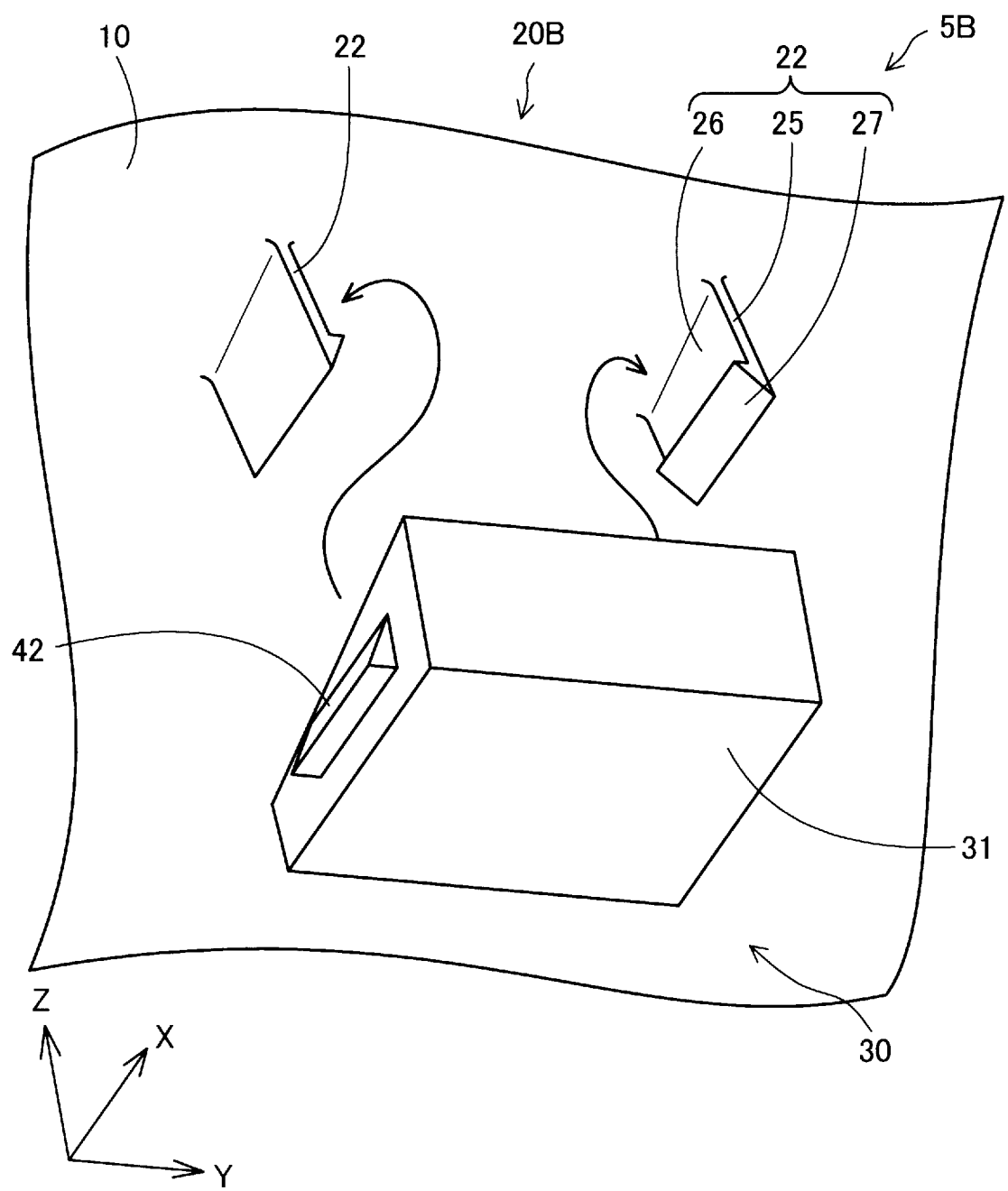
FIG. 6 is a perspective view which illustrates an attachment unit for a vehicle part according to the second embodiment.
Figure 7:
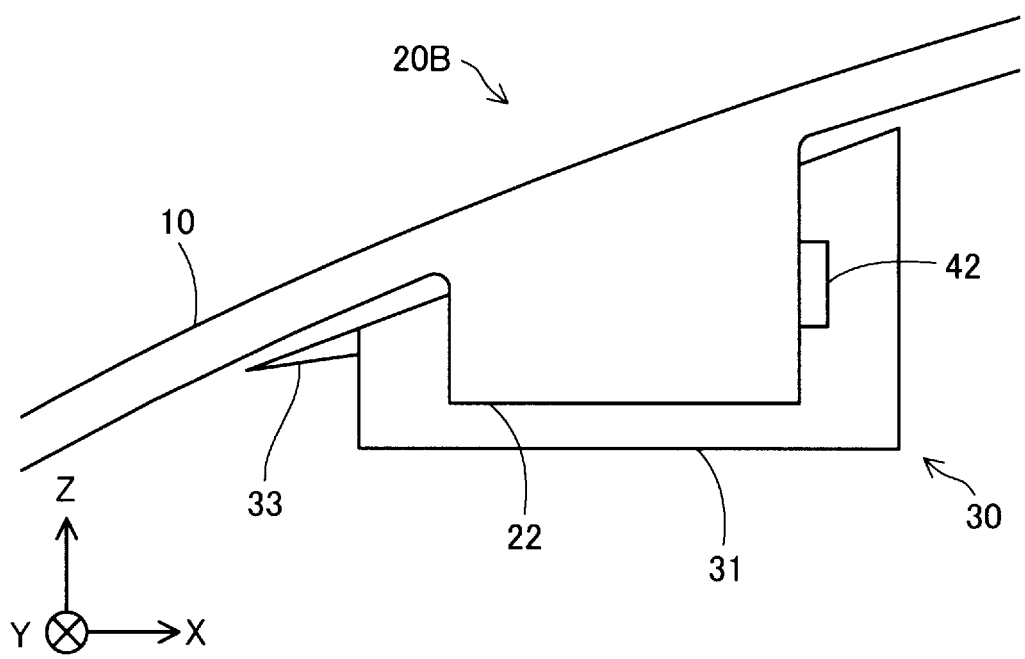
FIG. 7 is a left side view which illustrates an attachment unit for a vehicle part according to the second embodiment.
Figure 8:
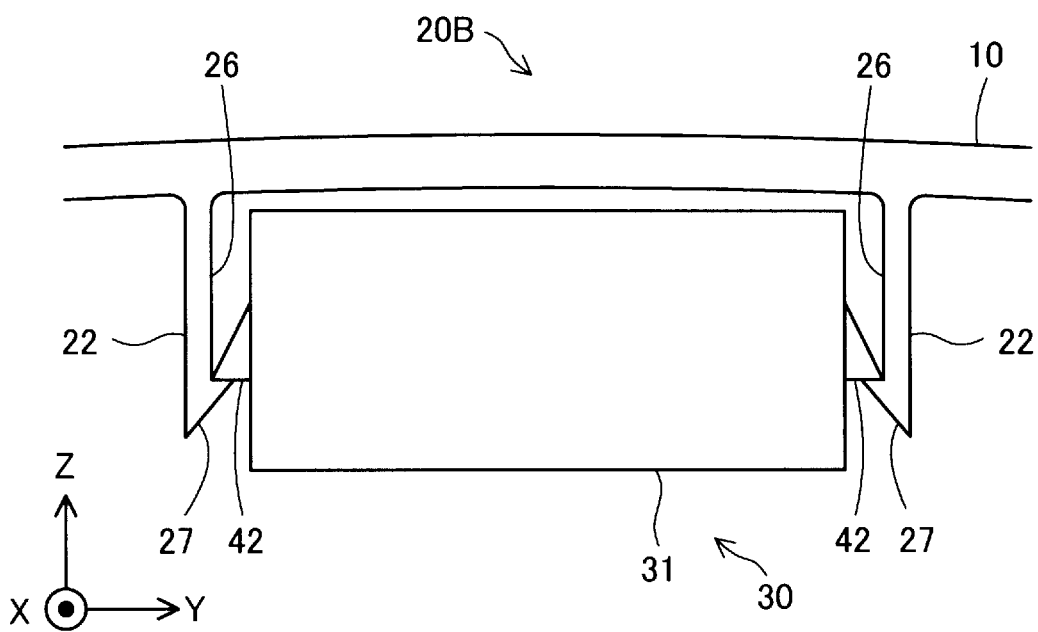
FIG. 8 is a rear view which illustrates an attachment unit for a vehicle part according to the second embodiment.

FIGS. 6 to 8 illustrate the attachment unit 5B for vehicles according to the second embodiment. The attachment unit 5B is designed in the form of a snap-fit joint and includes the attachment member 20B which is equipped with the second protrusions 22 each of which has a snap-fit structure shaped in the form of a cantilever beam of the snap-fit joint instead of the first protrusions 21 used in the first embodiment. The housing 31 of the vehicle-mounted camera 30 has the second snap-fit protrusions 42 (also referred to as second engaging portions) instead of the first pins 41 used in the first embodiment. Other arrangements are identical with those in the first embodiment.

The attachment member 20B includes the two second protrusions 22 which are arranged at a given interval away from each other in the width-wise direction (i.e., the Y-direction) of the vehicle 100. Each of the second protrusions 22 is made in the form of a cantilever that is a part of the snap-fit joint. Each of the second protrusions 22 includes the support rod 25 and the head 27. The support rod 25 vertically protrudes from the windshield 10 into the passenger compartment of the vehicle 100 and has the traversing surface 26 extending in a direction traversing the surface of the windshield 10. The support rod 25 is made in the form of a leaf spring which has a given width in the longitudinal direction (i.e., the X-direction) of the vehicle 100. The head 27 is bent from the end of the support rod 25 in a barbed shape and extends in the width-wise direction (i.e., the Y-direction) of the vehicle 100.

The housing 31 of the vehicle-mounted camera 30 has the second snap-fit protrusions 42 protruding from right and left side surfaces thereof outwardly (i.e., the Y-direction). Each of the second snap-fit protrusions 42 is in the shape of a triangular pole and oriented to have a length or axis extending in the longitudinal direction of the housing 31. Each of the snap-fit protrusions 42 has three side surfaces one of which is in contact with the side surface of the housing 31. As viewed from behind the vehicle-mounted camera 30, each of the snap-fit protrusions 42 is of a right triangle with two vertexes contacting the housing 31 and a base extending from the housing 31 outwardly in the width-wise direction of the vehicle 100 (i.e., the Y-direction).

The securement of the vehicle-mounted camera 30 to the attachment member 20B of the windshield 10 is achieved by arranging the vehicle-mounted camera 30 with the second snap-fit protrusions 42 located below the second protrusions 22 of the attachment member 20B, moving the vehicle-mounted camera 30 upward between the second protrusions 22, and pressing the second snap-fit protrusions 42 against the second protrusions 22, thereby causing the support rods 25 of the second protrusions 22 to be elastically deformed to flex the head 27 outward in the width-wise direction of the vehicle 100 (i.e., the Y-direction), so that the vehicle-mounted camera 30 is snap-fit between the second protrusions 22. When the second snap-fit protrusions 42 are forced more deeply than the heads 27 of the second protrusions 22, it causes the second protrusions 22 to be elastically returned back to their original shape, so that the second snap-fit protrusions 42 contact the traversing surfaces 26 of the second protrusions 22, thereby creating snap-fit joints of the second snap-fit protrusions 42 and the second protrusions 22. This firmly secures the vehicle-mounted camera 30 to the windshield 10. When the vehicle-mounted camera 30 is attached to the windshield 10, the second protrusions 22 lie out of the image-recognition angle of view of the vehicle-mounted camera 30.

The attachment unit 5B for vehicles is designed to create snap-fit engagement of the second snap-fit protrusions 42 with the second protrusions 22, thereby achieving a mechanical joint of the vehicle-mounted camera 30 to the windshield 10 without any misalignment of the vehicle-mounted camera 30 with the windshield 10.

Use of the snap-fit feature of the attachment member 20B facilitates firm attachment of the vehicle-mounted camera 30 to the windshield 10.

Third Embodiment

Figure 9:
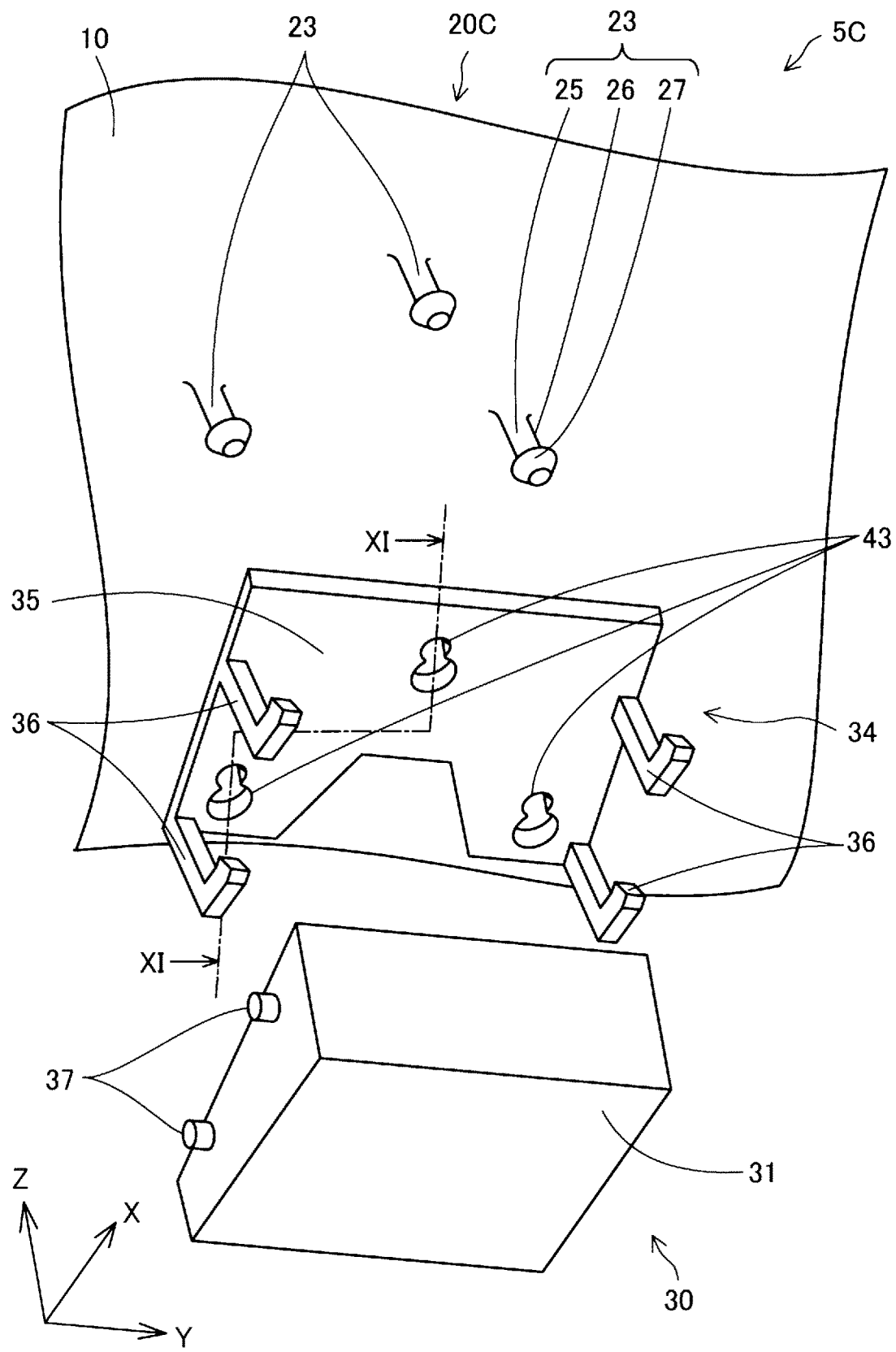
FIG. 9 is a perspective view which illustrates an attachment unit for a vehicle part according to the third embodiment.
Figure 10:
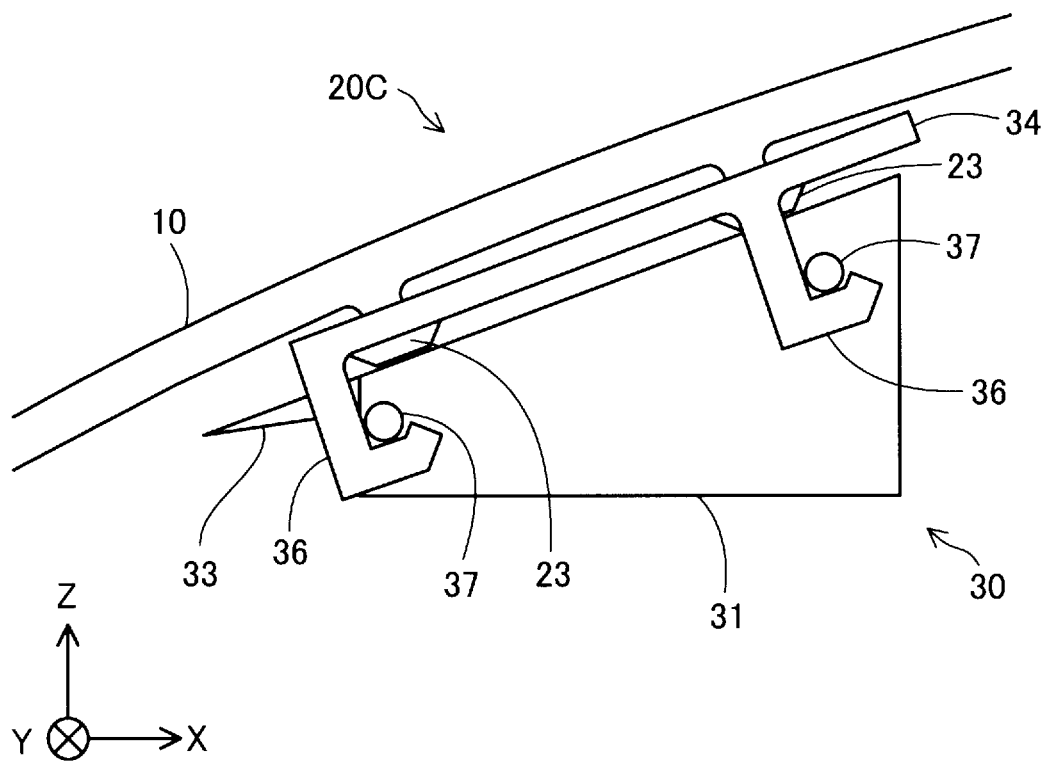
FIG. 10 is a left side view which illustrates an attachment unit for a vehicle part according to the third embodiment.
Figure 11:
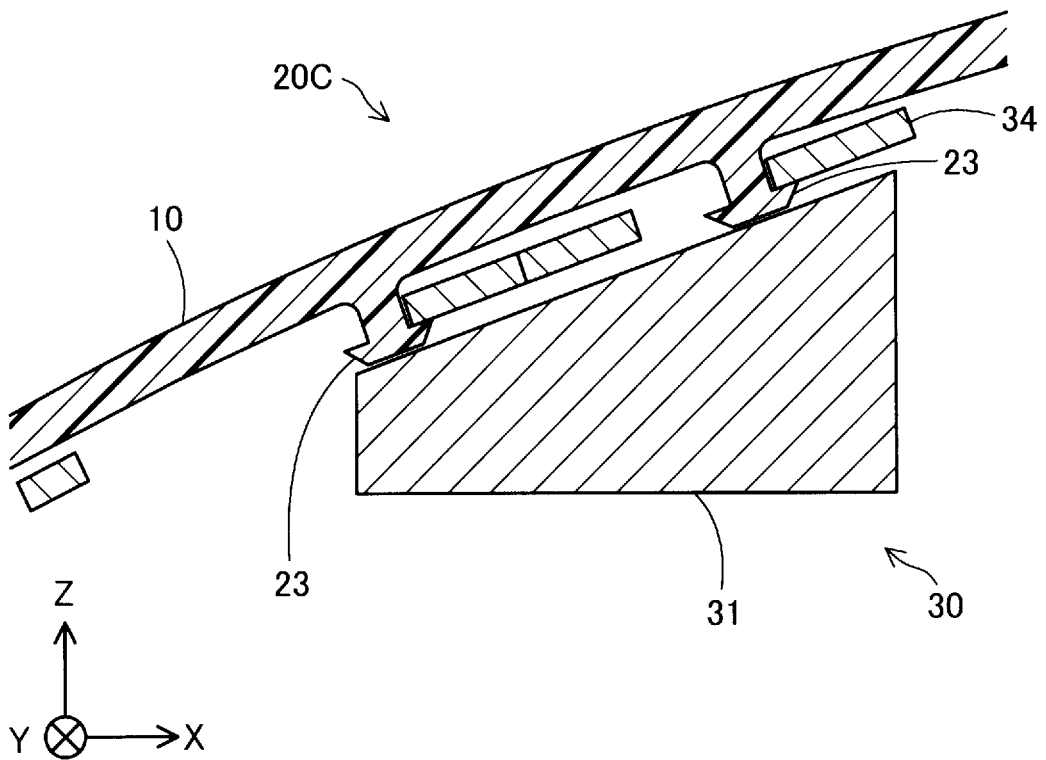
FIG. 11 is a sectional view taken along the line XI-XI in FIG. 9.

FIGS. 9 to 11 illustrate the attachment unit 5C for vehicles according to the third embodiment. The attachment member 20C is equipped with the third protrusions 23 instead of the first protrusions 21 used in the first embodiment. The housing 31 of the vehicle-mounted camera 30 is secured to the windshield 10 using the bracket 34. Other arrangements are identical with those in the first embodiment, and explanation thereof in detail will be omitted here.

Each of the third protrusions 23 includes the support rod 25 and the head 27. The support rod 25 vertically protrudes from the windshield 10 inside the vehicle 100 and has the traversing surface 26 extending in a direction traversing or perpendicular to the windshield 10. The head 27 is of a flange shape which has a diameter larger than that of the support rod 25. The attachment member 20C is equipped with two arrays: front and rear arrays of the third protrusions 23 which are arranged at a given interval away from each other in the longitudinal direction of the vehicle 100 (i.e., the X-direction). Specifically, the front array includes the two third protrusions 23 disposed at a given interval away from each other in the width-wise direction of the vehicle 100 (i.e., the Y-direction). The rear array includes the one third protrusion 23 located intermediate between the front array of the third protrusions 23 arranged adjacent each other in the width-wise direction of the vehicle 100 (i.e., the Y-direction). In brief, the attachment member 20C has the three third protrusions 23.

The vehicle-mounted camera 30 is equipped with the bracket 34 which includes the flat plate 35 and bracket protrusions 36 designed in the shape of a hook. The flat plate 35 has formed therein three third holes 43 (also referred to as third engaging portions) each of which is aligned with one of the third protrusions 23. Each of the third holes 43 is designed in the shape of a hook slot made of a combination of a small-diameter hole and a large-diameter hole. The bracket 34 has two arrays: a front array of bracket protrusions 36 and a rear array of bracket protrusions 36 which are arranged, like the first protrusions 21 in the first embodiment (see FIGS. 2 to 5), at a given interval away from each other in the longitudinal direction of the vehicle 100 (i.e., the X-direction). The front array includes the two bracket protrusions 36 which are located on right and left edges of the flat plate 35 and arranged at a given interval away from each other in the width-wise direction of the vehicle 100 (i.e., the Y-direction). Similarly, the rear array includes the two bracket protrusions 36 which are located on the right and left edges of the flat plate 35 and arranged at a given interval away from each other in the width-wise direction of the vehicle 100 (i.e., the Y-direction). In brief, the bracket 34 has a total of four bracket protrusions 36. The bracket 34 is one of vehicle parts.

The housing 31 of the vehicle-mounted camera 30 has disposed on the right and left side walls thereof the cylindrical bracket pins 37 (also referred to as bracket engaging portions) which, like the first pins 41 in the first embodiment (see FIGS. 2 to 5), protrude outward from the housing 31 in the Y-direction. Specifically, the bracket pins 37 are arranged one near each of the front and rear ends of the left side surface of the housing 31 and also located near the upper edge of the left side surface of the housing 31. Similarly, the bracket pins 37 are arranged one near each of the front and rear ends of the right side surface of the housing 31 and also located near the upper edge of the right side surface of the housing 31. The bracket pins 37 on the left side surface of the housing 31 are aligned with those on the right side surface of the housing 31 in the lateral direction of the vehicle 100 (i.e., the Y-direction). The housing 31, therefore, has a total of four bracket pins 37.

The securement of the vehicle-mounted camera 30 to the attachment member 20C of the windshield 10 is achieved by attaching the housing 30 to the windshield 10 using the bracket 34. The attachment of the bracket 34 to the windshield 10 is accomplished by placing the bracket 34 with the third holes 43 located below the third protrusions 23, moving the bracket 34 upward to insert the third protrusions 23 into the large-diameter holes of the hook slot-shaped third holes 43 until the heads 27 of the third protrusions 23 pass the third holes 43, respectively, and then sliding the bracket 34 frontward until the support rods 25 of the third protrusions 23 contact inner edges of the small-diameter holes of the hook slot-shaped third holes 43, so that the support rods 25 contact the inner edges of the small-diameter holes of the hook slot-shaped third holes 43, thereby creating engagement of the third protrusions 23 with the third holes 43 to make firm joint of the bracket 34 to the windshield 10.

The securement of the housing 31 to the bracket 34 is achieved by engaging the bracket pins 37 of the housing 31 with the bracket protrusions 36 of the bracket 34 to make a mechanical joint of the housing 31 with the bracket 34. How to engage the bracket pins 37 with the bracket protrusions 36 is the same as how to engage the first pins 41 with the first protrusions 21 in the first embodiment, and explanation thereof in detail will be omitted here.

The attachment unit 5C for vehicles is designed to make engagement of the third holes 43 with the third protrusions 23 to make a firm joint of the vehicle-mounted camera 30 with the windshield 10 without any misalignment of the vehicle-mounted camera 30 from the windshield 10.

Fourth Embodiment

Figure 12:
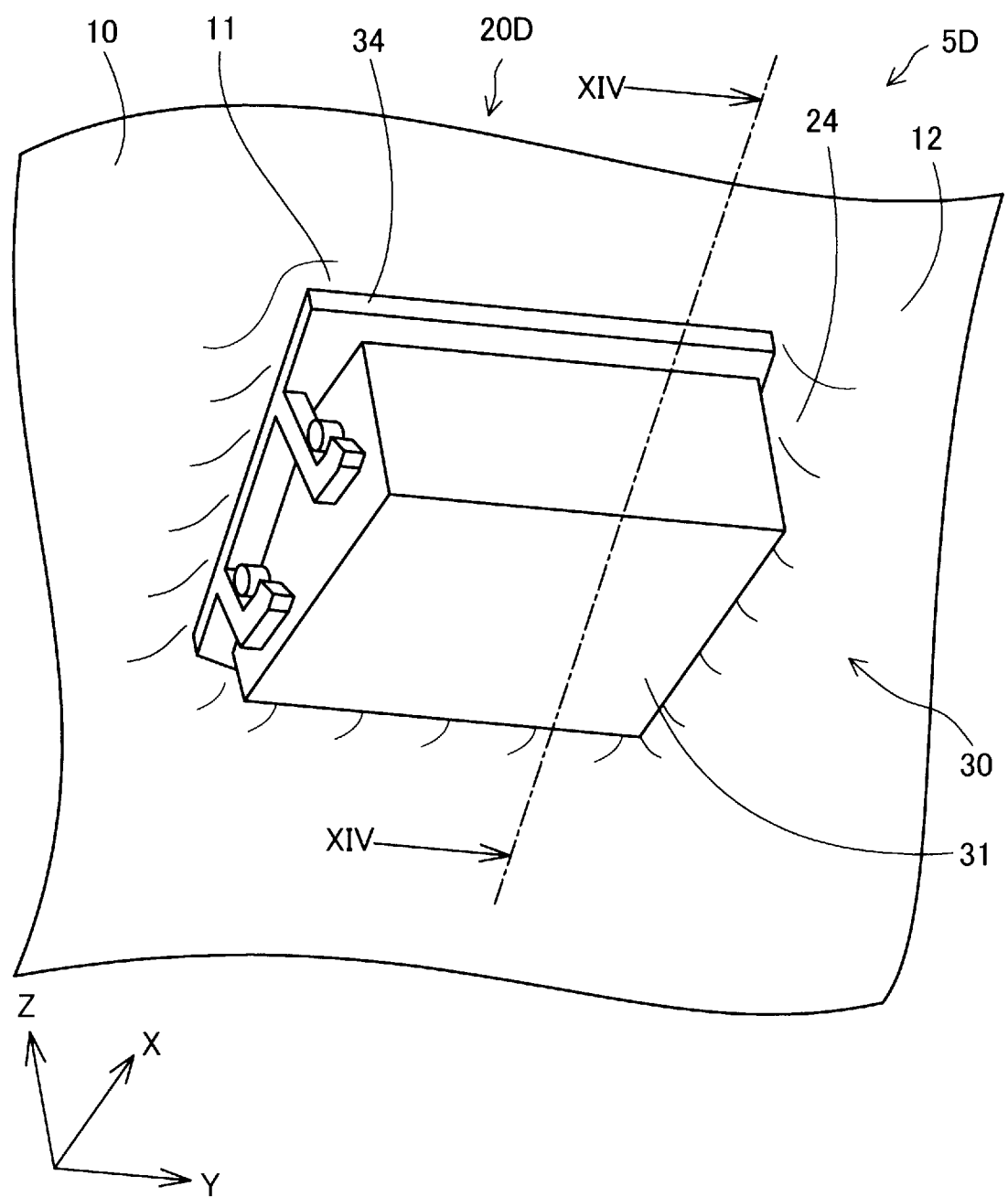
FIG. 12 is a perspective view which illustrates an attachment unit for a vehicle part according to the fourth embodiment.
Figure 13:
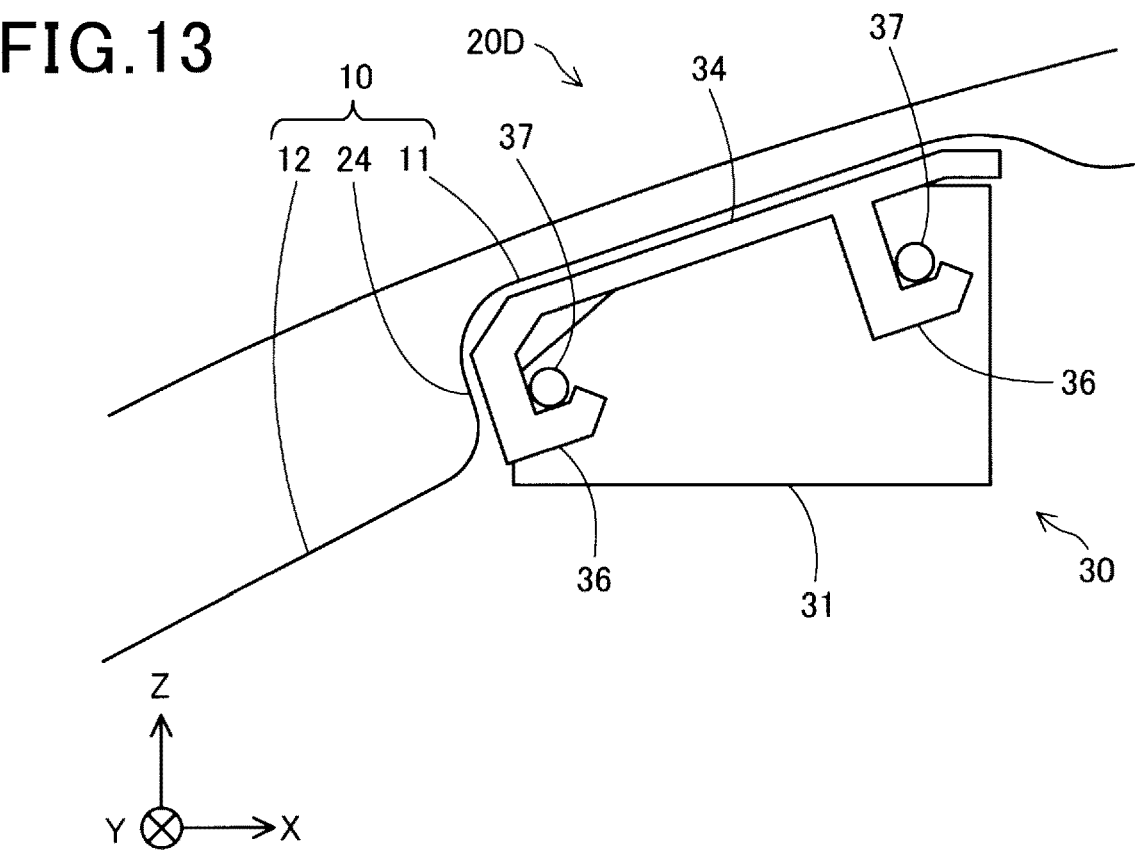
FIG. 13 is a left side view which illustrates an attachment unit for a vehicle part according to the fourth embodiment.
Figure 14:
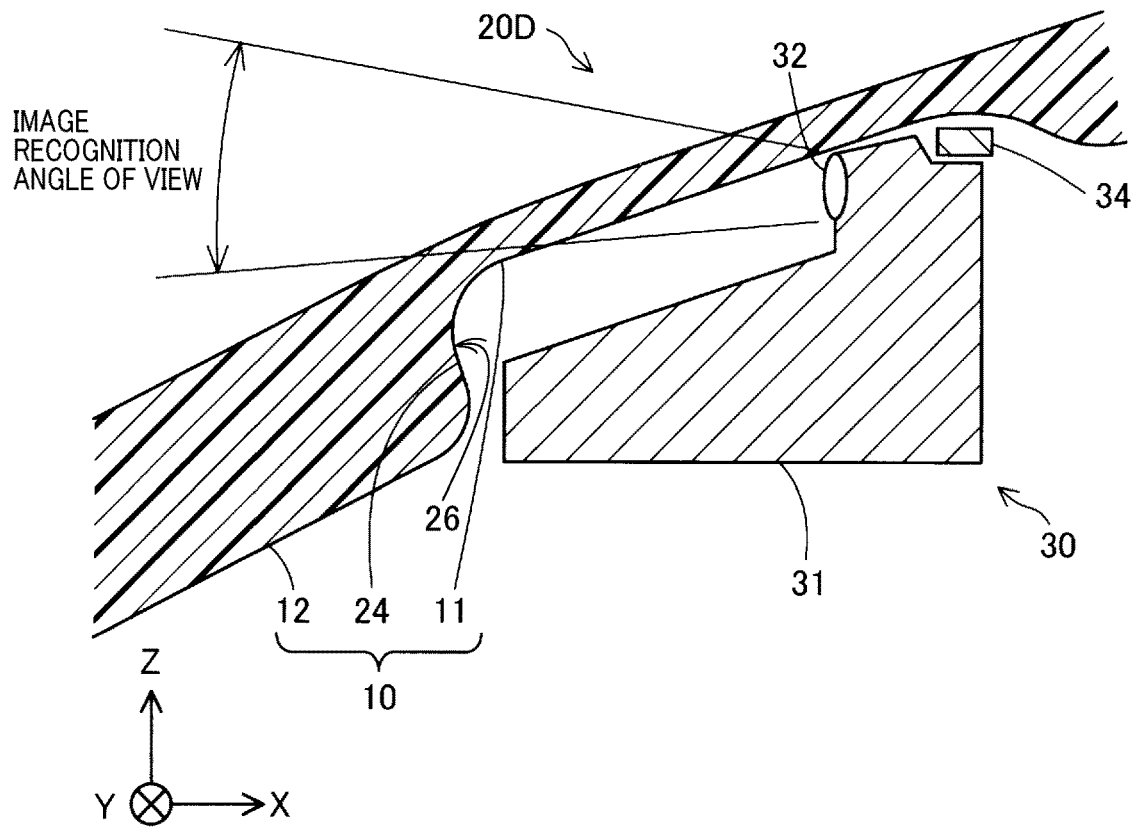
FIG. 14 is a sectional view taken along the line XIV-XIV in FIG. 12.

FIGS. 12 to 14 illustrate the attachment unit 5D for vehicles according to the fourth embodiment. The attachment unit 5D is, like the attachment unit 5C in the third embodiment, designed to secure the housing 31 of the vehicle-mounted camera 30 to the attachment member 20D of the windshield 10 using the bracket 34. The attachment member 20D is equipped with the vertical wall 24 (also referred to as a step) instead of the third protrusions 23 used in the third embodiment. Other arrangements are identical with those in the third embodiment (see FIGS. 9 to 11), and explanation thereof in detail will be omitted here.

The windshield 10 includes the first region 11 and the second region 12. The first region 11 has a surface (i.e., a portion of an inner surface of the vehicle 100) facing the vehicle-mounted camera 30. The second region 12 has a portion of the inner surface of the vehicle 100 and lies outside the perimeter of the first region 11 (i.e., an outer periphery of the attachment member 20D). The first region 11 is recessed from the second region 12. The first region 11 and the second region 12 define therebetween the vertical wall 24 which extends perpendicular to the first and second regions 11 and 12. The vertical wall 24 has the traversing surface 26 extending in a direction intersecting with the first and second regions 11 and 12.

The bracket 34 of the vehicle-mounted camera 30 is designed to have the same structure as that in the third embodiment except for the third holes 43. The housing 31 of the vehicle-mounted camera 30 has the same structure as that in the third embodiment.

The securement of the vehicle-mounted camera 30 to the attachment member 20D of the windshield 10 is, like in the third embodiment, achieved by attaching the housing 31 to the windshield 10 using the bracket 34. The attachment of the bracket 34 to the windshield 10 is accomplished by placing the front end of the bracket 34 in contact with the vertical wall 24 to position the bracket 34 relative to the windshield 10 and then joining the upper surface of the bracket 34 and the inner surface of the windshield 10 together using adhesive agent or adhesion tape to make a mechanical joint of the bracket 34 with the windshield 10. How to How to attach the housing 31 to the bracket 34 is the same as in the third embodiment, and explanation thereof in detail will be omitted here.

The attachment unit 5D for vehicles is, as described above, designed to make mechanical contact of the front end of the bracket 34 of the vehicle-mounted camera 30 with the vertical wall 24 to position the bracket 34 of the vehicle-mounted camera 30 relative to the windshield 10. This eliminates misalignment of the bracket 34 of the vehicle-mounted camera 30 from the windshield 10 when the bracket 34 of the vehicle-mounted camera 30 is adhered to the windshield 10.

The vertical wall 24 lies outside the image-recognition angle of view of the vehicle-mounted camera 30, thereby avoiding refraction of light by the vertical wall 24 adversely impinging on imaging by the vehicle-mounted camera 30.

Modifications

The attachment members 20A, 20B, 20C, and 20D may be combined together. For instance, the attachment member 20A in the first embodiment may be equipped with the first protrusions 21 and the second protrusions 22 used in the second embodiment. The attachment member 20B in the second embodiment may be equipped with the second protrusions 22 and the third protrusions 23 used in the third embodiment. Such combinations achieve a joint of the vehicle-mounted camera 30 with the windshield 10 without any misalignment therebetween.

The housing 31 of the vehicle-mounted camera 30 in the third embodiment is, as described above, joined to the third protrusions 23 of the windshield 10 using the bracket 34, but may be designed to have formed therein the third holes 43 to make a direct joint of the housing 31 to the third protrusions 23 without use of the bracket 34. This also minimizes misalignment of the vehicle-mounted camera 30 from the windshield 10.

The housing 31 of the vehicle-mounted camera 30 in the fourth embodiment is, as described above, adhered to the windshield 10 using the bracket 34, but may be bonded to the windshield 10 without use of the bracket 34. The positioning of the housing 31 relative to the windshield 10 is achieved by contacting the front end of the housing 31 with the vertical wall 24, thereby enabling the vehicle-mounted camera 30 to be joined to the windshield 10 without any misalignment of the vehicle-mounted camera 30 from the windshield 10.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An attachment unit for a vehicle part comprising:
an attachment member which is formed as part of a window of a vehicle; and
a traversing surface which is formed on the attachment member and extends in a direction traversing the window,
wherein a vehicle part is brought into contact with the surface formed on the attachment member and positioned relative to or secured to the window.

2. An attachment unit for a vehicle part as set forth in claim 1, wherein the attachment member includes a first protrusion which has said traversing surface and protrudes inside the vehicle, wherein the first protrusion is in a hook shape with a bent head, and wherein the vehicle part is equipped with a first engaging portion which engages the first protrusion.

3. An attachment unit for a vehicle part as set forth in claim 2, wherein the attachment member includes a second protrusion which has said traversing surface and protrudes inside the vehicle, wherein the second protrusion is shaped to have a snap-fit structure, and wherein the vehicle part includes a second engaging portion which engages the second protrusion.

4. An attachment unit for a vehicle part as set forth in claim 1, wherein the attachment member includes a second protrusion which has said traversing surface and protrudes inside the vehicle, wherein the second protrusion is shaped to have a snap-fit structure, and wherein the vehicle part includes a second engaging portion which engages the second protrusion.

5. An attachment unit for a vehicle part as set forth in claim 1, wherein the attachment member includes a third protrusion which has said traversing surface and protrudes inside the vehicle, wherein the third protrusion has a flange-shaped head, and wherein the vehicle part includes a third engaging portion which engages the third protrusion.

6. An attachment unit for a vehicle part as set forth in claim 1, wherein the window includes a first region and a second region, the first region having a first portion of an inner surface of the vehicle, the second region having a second portion of the inner surface of the vehicle which lies outside an outer periphery of the attachment member of the window, the first region being recessed from the second region, wherein the attachment member includes a vertical wall which has the traversing surface between the first and second regions, and wherein the vertical wall contacts the vehicle part.

7. An attachment unit for a vehicle part as set forth in claim 1, wherein the vehicle part is a vehicle-mounted camera, wherein the traversing surface lies outside an image-recognition angle of view that is an image-recognizing range of an angle of view imaged by the vehicle-mounted camera.

8. An attaching method for a vehicle part comprising:
placing a vehicle part in contact with a traversing surface which is formed as part of a window of a vehicle and extends in a direction traversing a surface of the window; and
positioning or securing the vehicle part to the window by contact of the vehicle part with the traversing surface.

9. A windshield of a vehicle comprising:
an attachment member formed as part of the windshield; and
a traversing surface which is formed on the attachment member and extends in a direction traversing the windshield,
wherein a vehicle part is brought into contact with the surface formed on the attachment member and positioned relative to or secured to the windshield.

* * * * *